July 11, 1961 E. F. BARRETT ET AL 2,992,024
ROTARY SEAL
Filed July 11, 1956

INVENTORS.
Edward F. Barrett,
BY Harry B. Bak,
George H. Simmons &
Edward A. Haight ATTYS

United States Patent Office 2,992,024
Patented July 11, 1961

2,992,024
ROTARY SEAL
Edward F. Barrett, Westchester, and Harry B. Bak, Chicago, Ill., assignors to Victor Manufacturing & Gasket Co., Chicago, Ill., a corporation of Illinois
Filed July 11, 1956, Ser. No. 597,244
3 Claims. (Cl. 286—11)

This invention relates to rotating face type seals and has for its principal object the provision of a new and improved seal of this type.

It is a main object of the invention to provide a rotary face type seal that is fixed upon a shaft and rotated therewith in complete positive drive relation throughout all the components thereof, and forms a tight seal against liquids and gases with the shaft and with a properly prepared mating member through which the shaft projects.

Another object of the invention is to provide a rotary face seal having a low friction sealing ring and an elastomer diaphragm in which the sealing ring is fitted, and a metallic shell with which the diaphragm has a press fit relation to cushion the sealing ring with respect to vibratory relationship with the mating member sometimes caused by unbalance or pulsation of pumps and similar machines.

Another object of the invention is to provide a rotary face seal in which an elastomer diaphragm has a sleevelike extension that embraces the shaft and is held thereagainst in seal forming and driving relation by a metal band of inside cylindrical configuration which applies pressure to the sleeve uniformly around its circumference.

Further objects of the invention not specifically mentioned here will be apparent from the detailed description and claims which follow, reference being had to the accompanying drawings in which a preferred embodiment of the invention is shown by way of example and in which:

Figure 2:
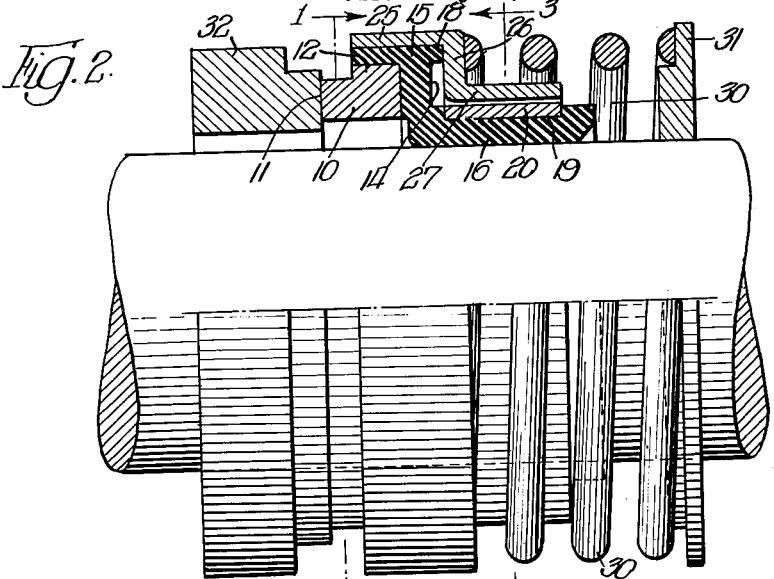
FIG. 2 is a side view of the seal in quarter section, showing also the shaft and complementary sleeve member.

Rotating type seals fixed upon a shaft in seal forming engagement therewith and having axial movement therealong are known in the prior art of which we are aware. Such seals are provided with a low friction sealing ring, the sealing face of which is lapped to a high degree of flatness. The sealing ring of the prior art devices of which we are aware has a press fit with an elastomer diaphragm which is encased in a metal shell and has a sleevelike extension embracing the shaft to form a seal and driving connection therewith. Various arrangements have been employed in these prior art devices to establish a driving connection between the shaft and the shell, the shell and the diaphragm, and the diaphragm and sealing ring.

The present invention improves upon these prior art devices by providing a positive, shock insulated, driving connection between all component parts. This is accomplished by providing a sealing ring having a base portion of diameter slightly larger than the diameter of the lapped sealing face of the ring, which base is flattened at diametrically opposite bands into tangential relation with the outer edge of the sealing face. The base portion is fitted within the cup area of an elastomer diaphragm that has a calculated displacement type press fit in a metal shell.

The outer cylindrical portion of the diaphragm extends axially away from the sealing ring and abuts against a radial surface in the metallic shell to space the radial flexing area of the diaphragm from the shell to allow ease of movement and also to effect resilient shock absorbence. The diaphragm has a sleevelike extension embracing the shaft and extending axially therealong, which extension is held firmly against the shaft by a torque retention band composed of metal and having a cylindrical inner surface which supplies pressure uniformly around the circumference of the outer cylindrical surface of the extension to insure proper sealing and driving fit to the shaft. The outer surface of the torque retention band is flattened in spaced apart zones and a sleevelike portion of the metallic shell is telescoped over the torque retention band and has flattened portions registered with the flattened portions on that band to form connection therebetween that is freely slidable axially. A spring extending between a spring retainer fixed upon the shaft and a radial surface on the metallic shell and having a press or snap fit engagement therewith to form a unit maintains pressure between the sealing face of the sealing ring and the complementary stationary member engaged thereby, in the usual manner.

The invention will be best understood by reference to the drawings, wherein it will be seen that the sealing ring 10, which may be composed of carbon black, graphite, a synthetic resinous material, metal or of other suitable material, has a polished sealing surface 11 that is lap finished to from two to four light bands of absolute flatness, for specific applications, and to a greater number of light bands for other uses. The sealing ring 10 has a base portion 12 whose diameter is slightly larger than that of the sealing face 11, which base portion has diametrically opposed surfaces 13 that are flat and disposed tangentially to the outer edge of the sealing face 11.

The device includes an elastomer diaphragm having a radial portion 14, an outer cylindrical portion 15, and an axially extending sleevelike portion 16. The sealing ring 10 as heretofore described, having flattened surfaces 13 on the base portion 12 thereof, fits within the diaphragm, with a displacement type press fit to the inside surface of the cylindrical portion 15 and the front face of the radial portion 14 thereof. The outer cylindrical portion 15 of the elastomer diaphragm contains a projection 18 that extends axially beyond the radial portion 14 thereby to provide a shock cushion for the sealing ring 10, and a more effective seal around the sealing ring 10. Projection 18 also provides clearance between the respective radial walls of the diaphragm 14 and the metallic shell 26 for ease of flexible movement of the diaphragm with minimum pressure from spring 30.

Figure 4:
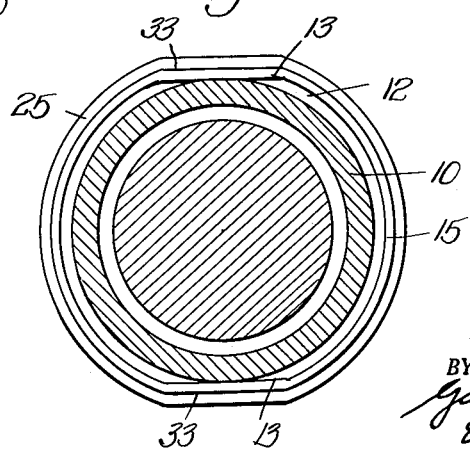
FIG. 4 is a view similar to FIG. 1 but showing the preferred embodiment of the invention.

As will be seen in FIG. 4, the outer cylindrical portion 25 of the shell has flattened portions 33 registered with the flattened area of the diaphragm 15 and thereby with the faces 13 on the base of the ring. The outer cylindrical portion 15 of the diaphragm is of uniform thickness throughout. This arrangement establishes the unitary construction of the front or sealing ring 10 section of the seal which, when combined with the rear section of unitary construction as described in the following, completes the primary form of the invention.

The sleevelike extension 16 of the diaphragm which projects axially from the inner edge of the radial portion 14 thereof is provided with an outwardly opening channel 19 in which a torque retaining band 20 is disposed. As will be seen best in FIG. 3, the bottom of this channel 19 is cylindrical and the inner surface of the torque retention band 20 engaged therewith is likewise cylindrical, so that when the seal is registered with a shaft the cylindrical sleevelike portion 16 thereof will be compressed uniformly around the entire periphery of the sleeve, with the result that there are no zones of lessened pressure through which leakage may develop.

Figure 3:
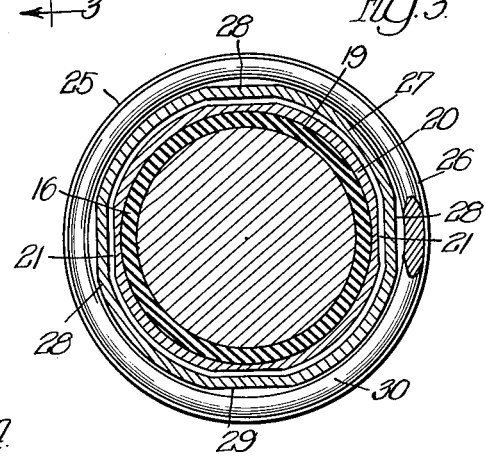
FIG. 3 is a cross sectional view taken along the line 3—3 of FIG. 2, looking in the direction of the arrows.

The torque retention band 20 is of radial thickness sufficient to permit flattening its outer surface in zones 21, best seen in FIG. 3.

The metallic shell has an outer cylindrical portion 25 against which the outer surface of the portion 15 of the diaphragm has a press fit. The shell has a radial wall member 26 extending inwardly from the outer cylindrical portion 25 and a sleevelike portion 27 that is telescoped over the torque retention band 20. The sleevelike portion 27 of the shell is flattened in zones 28 which are registered with the flattened surfaces 21 on the torque retention band 20 to form a driving connection therewith.

The seal thus formed is used in conjunction with a compression spring 30 fixed upon the shaft by a spring retainer 31 and with a stationary sealing member 32, all of which are of known construction, forming no essential part of the present invention. The stationary sealing ring 32 may be either a portion of the wall of the casing through which the shaft projects, or may be a polished metallic insert registered with a bore in that wall in seal forming engagement therewith. The particular type of stationary ring is not of the essence of the present invention.

Figure 1:
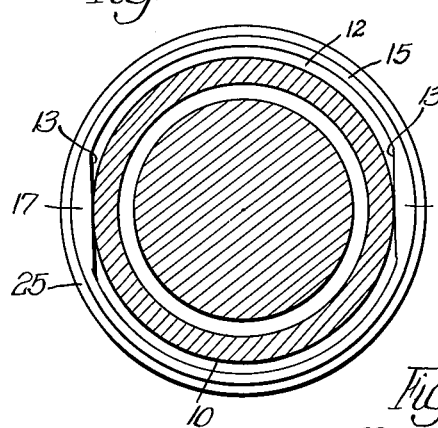
FIG. 1 is an end elevational view of a seal in section along line 1—1 of FIG. 2, and represents one embodiment of many possible to the primary objective of the invention.

In FIG. 1, we have shown a modified form of the invention in which the sealing ring 10 is identical with that hereto described, having flattened surfaces 13 on base portion 12 thereof. The sealing ring fits within and is bonded to the inside surface of the cylindrical portion 15 of the diaphragm. The cylindrical portion 15 is thickened in diametrically opposite bands 17 which register with and are bonded to the flattened faces 13 on the base 12 of the sealing ring 10. Under certain conditions the arrangement in FIG. 1 may be advantageous.

Seals in devices subject to intermittent use may dry out in the band of engagement of the sealing ring with the mating member and increased drag on the sealing ring will be thereby developed. Thus, for example, the seal in the pump of a pressure water system, being lubricated by water only, may dry out during periods of low water consumption. Under such conditions, break away strains on the sealing ring are increased and, due to the rapid acceleration of the pump to operating speed, damage to the sealing rings of prior art devices sometimes occurs. In the embodiment of the invention shown in FIG. 1, the thickened portion 17 of the diaphragm cushions the sealing ring in addition to transmitting driving torque thereto, and break away is accomplished without damage to the sealing ring. In the embodiment of the invention shown in FIG. 4, the flattened portions 33 of the shell register with the flats 13 on the sealing ring to form a positive drive for the ring and the wall 15 of the diaphragm cushions thus drive so that break away stresses will not injure the sealing ring.

From the foregoing, it will be apparent that the rotary face type seal of our invention provides a positive seal between the elastomer diaphragm and the sealing ring and a positive seal between the shaft and the diaphragm extension. It will also be apparent that the invention provides a means of absorbing the rotational vibrations, present in most applications at the sealing face, by cushioning the sealing ring in an elastomer cup. It will also be apparent that the seal will act as a complete unit, the parts of which are maintained in positive relation to each other through the use of the flattened faces, a unit that assures positive sealing against high torque, high pressures and high temperatures. The elastomer in the unit is free from torque fatigue.

While we have chosen to show our invention by illustrating and describing a preferred embodiment of it, we have done so by way of example only, as there are many modifications and adaptations which can be made by one skilled in the art within the teachings of the invention.

Having thus complied with the statutes, and shown and described a preferred embodiment of our invention, what we consider new and desire to have protected by Letters Patent is pointed out in the appended claims.

What we claim is:

1. A device for forming a seal with a stationary surface that is disposed radially of a shaft, comprising: a sealing ring having a polished end surface for engaging the stationary surface; a base portion of diameter larger than that of the polished end surface, and a radially disposed rear surface, said base portion having spaced apart flat bands in its outer edge; an elastomer diaphragm engaging the outer edge and rear surface of said base portion; a cylindrical extension of said diaphragm extending rearwardly from the inner edge of the diaphragm and sealing ring and containing a central opening through which a shaft may be extended; a metal band of cylindrical configuration surrounding said extension of the diaphragm; and a metal shell having a cylindrical portion in press fit engagement with the outer edge engaging portion of the diaphragm and surrounding said metal band, said shell having a driving connection with said metal band and with said diaphragm and sealing ring.

2. A device as specified in claim 1, in which the diaphragm is thickened adjacent the flat bands on the sealing ring to establish the driving connection between the diaphragm and the sealing ring.

3. A device as specified in claim 1, in which the diaphragm engaging portion of the shell is flattened in bands registered with the flat bands on the base of the sealing ring and in which the diaphragm has press fit with the shell and sealing ring base to establish a driving connection therebetween.

References Cited in the file of this patent

UNITED STATES PATENTS 2,461,907     Magnesen             Feb. 15, 1949

FOREIGN PATENTS 611,503     Great Britain           Oct. 29, 1948